United States Patent [19]

Kudou

[11] Patent Number: 5,483,353
[45] Date of Patent: Jan. 9, 1996

[54] FACSIMILE APPARATUS HAVING OFF PERIOD FOR IMAGE DATA RECORDING

[75] Inventor: Mituru Kudou, Hachioji, Japan

[73] Assignee: Kabushiki Kaisha Toshiba, Kawasaki, Japan

[21] Appl. No.: 276,487

[22] Filed: Jul. 18, 1994

Related U.S. Application Data

[63] Continuation of Ser. No. 835,853, Feb. 18, 1992, abandoned.

[30] Foreign Application Priority Data

Feb. 19, 1991 [JP] Japan ..................... 3-131713

[51] Int. Cl.$^6$ ..................... H04N 1/00
[52] U.S. Cl. ..................... 358/404; 358/422
[58] Field of Search ..................... 358/400, 406, 358/413, 444, 296, 419–423; 355/282, 285, 286, 289; 219/216; H04N 4/00

[56] References Cited

U.S. PATENT DOCUMENTS

| | | | |
|---|---|---|---|
| 4,868,368 | 9/1989 | Araki | 219/216 |
| 4,907,094 | 3/1990 | Mishima et al. | 358/404 |
| 5,040,022 | 8/1991 | Kinoshita et al. | 355/285 |
| 5,068,675 | 11/1991 | Momose | 355/285 |
| 5,155,602 | 10/1992 | Terajima | 358/440 |
| 5,177,620 | 1/1993 | Fukushima | 358/404 |
| 5,216,520 | 6/1993 | Omura et al. | 358/405 |
| 5,270,830 | 12/1993 | Suzuki | 358/400 |

FOREIGN PATENT DOCUMENTS 4-264870  9/1992  Japan.

Primary Examiner—Scott A. Rogers
Assistant Examiner—Kim Yen Vu
Attorney, Agent, or Firm—Finnegan, Henderson, Farabow, Garrett & Dunner

[57] ABSTRACT

A facsimile apparatus which is improved so as to reduce power consumption in a recording unit which requires a large power. This facsimile apparatus is so arranged that a time zone is set in which no received image data are to be printed and output from a recording unit, power supply to the recording unit is stopped during the set time zone, image data received in this time zone is temporarily stored into an image memory, thereafter, the power is supplied to the recording unit and, when the recording unit becomes operative, the image data temporarily stored in the image memory is printed and output by using the recording unit.

4 Claims, 6 Drawing Sheets

FACSIMILE APPARATUS HAVING OFF PERIOD FOR IMAGE DATA RECORDING

This application is a continuation of application Ser. No. 07/835,853, filed Feb. 18, 1992, now abandoned.

BACKGROUND OF THE INVENTION

1. Field of the Invention

The present invention relates to facsimile apparatus having a recording unit, and more particularly to a facsimile apparatus which is improved to reduce power consumption in a recording unit which requires a large power and which is adapted to record on a normal recording paper by fixing a toner with used of a heater.

2. Description of the Related Art

Recently, a facsimile apparatus has been proposed which records image data (a received document or the like) on a normal paper using a laser system or an LED system. Such apparatus has a heater which is used for fixing a toner on a recording paper (normal paper) and which consumes a large power close to 1000 watts. This type of heater is constantly supplied with a power to maintain a temperature of the heater at a predetermined temperature level so as to record and output image data immediately when the image data is received. In other words, a recording apparatus of this kind is always supplied with a large power even when image data is not actually printed on a recording paper and output.

Consequently, in a case where no received document is output for a long time, it results in a large power being wastefully consumed.

For example, it is usual that a few documents are received at night time and no attendant is available around such facsimile apparatus at night. In this case, although the received document is not required to be printed and output immediately, unnecessary large power is constantly supplied to the recording apparatus, which is extremely inconvenient from a standpoint of power consumption in the facsimile apparatus.

SUMMARY OF THE INVENTION

It is therefore an object of the present invention to provide a facsimile apparatus which is improved to reduce a power consumption in its recording unit which requires a large power.

In order to achieve the above object, the present invention is so arranged that a time-zone period is set in which no received documents are to be printed and output from a recording unit, power supply to the recording unit is stopped during this set time-zone period, document data received in this time zone is temporarily stored in an image memory, and after a lapse of this time-zone period, power is supplied to the recording unit to print and output the document data.

According to the present invention, there is provided a facsimile apparatus which comprises: image data reception means for receiving image data; image data recording means for recording and outputting the image data; image data storing means for temporarily storing the image data; timer means for supplying time data; operating means for setting a time zone period; power supply control means for stopping power supply to the image data recording means when the time data supplied by the timer means is within the time zone set by the operating means; and reception control means for storing in the image data storing means the image data received by the image data reception means while power supply to the image data recording means is being stopped by the power supply control means.

Further, according to the present invention, there is provided a facsimile apparatus which comprises: image data reception means for receiving image data; image data recording means for recording and outputting the image data; image data storing means for temporarily storing the image data; normal reception means for transferring the image data received by the image data reception means to the image data recording means; memory reception means for transferring the image data received by the image data reception means to the image data storing means for temporary storage; timer means for supplying time data; operating means for setting a time zone in which power supply to the image data recording means is stopped; power supply control means for stopping the power supply to the image data recording means if the time data supplied by the timer means is within the time zone set by the operating means and supplying the power to the image data recording means in a time zone other than the set time zone; and reception control means for controlling the normal reception means so as to perform reception in a normal reception mode during a period in which the power is supplied to the image data recording means by the power supply control means and for controlling the memory reception means so as to perform reception in a memory reception mode during a period in which the power supply to the recording means is stopped by the power supply control means.

In accordance with the facsimile apparatus of the present invention, since it is arranged to stop during the time zone set by the operating means the supply of power to the recording means which requires a large power and to receive the data in the storing means during that time zone, it is possible to remarkably reduce the power consumption of the facsimile apparatus by setting, as the time zone during which the power supply to the recording means is to be stopped, a time zone in which a few documents are received and the received documents are not to be immediately printed out.

DESCRIPTION OF THE PREFERRED EMBODIMENTS

One embodiment of the present invention will be described in detail with reference to the accompanying drawings.

Figure 1:
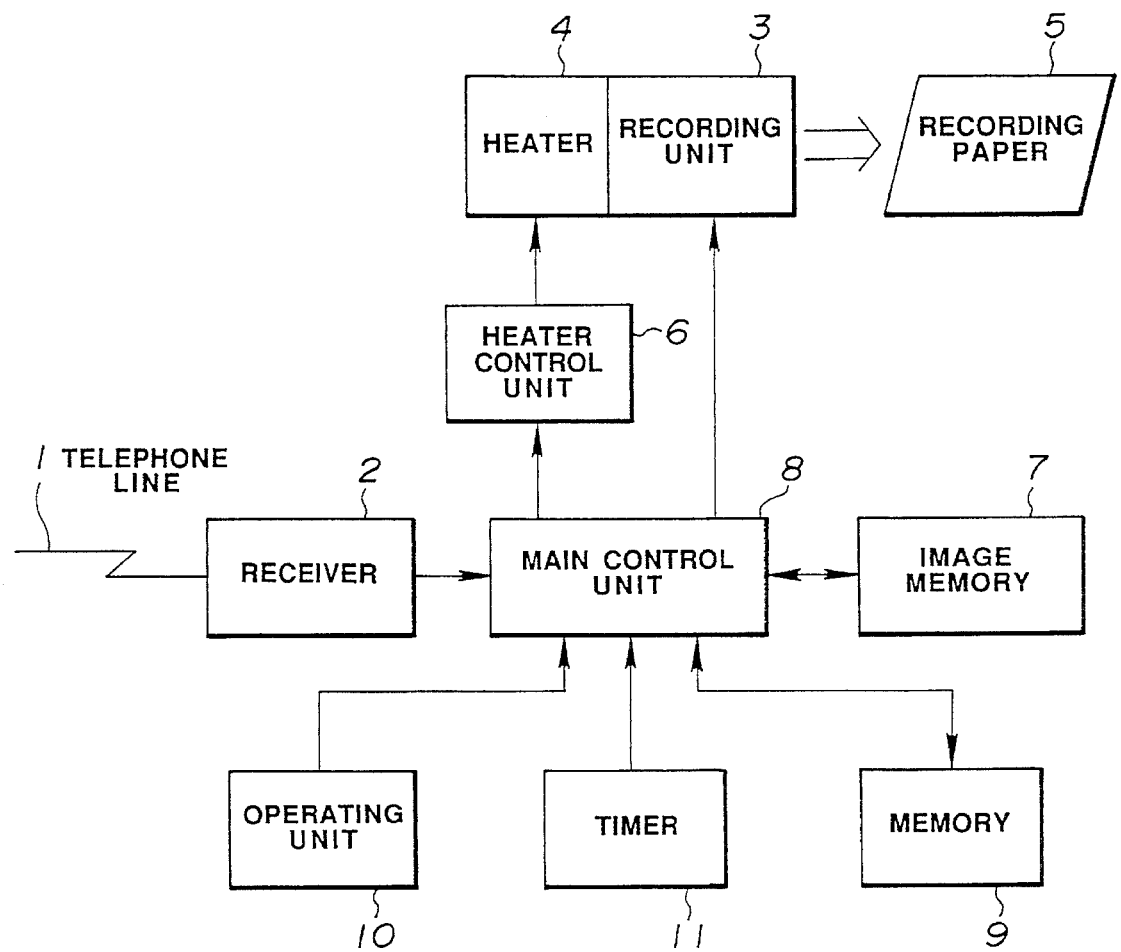
FIG. 1 is a block diagram of one embodiment of a facsimile apparatus according to the present invention.

FIG. 1 is a block diagram indicative of one embodiment of a facsimile apparatus according to the present invention. The facsimile apparatus of this embodiment is connected to a telephone line 1 and comprises a receiver 2 for receiving a facsimile signal from the telephone line 1 and demodulating the facsimile signal, a recording unit 3 for printing and outputting the received image data on a recording paper (regular paper) 5, a heater 4 for fixing a toner on the recording paper 5 when recording the received image data on the recording paper 5, a heater control unit 6 for controlling power supply to the heater 4 to maintain a heater temperature at a predetermined level, an image memory 7 for temporarily storing the received image data, a main control unit 8 for performing overall control of the apparatus including distribution of the received image data, setting of the operation time of the recording unit 3, and control of the operation of the recording unit 3, a memory 9 in which communication management data are recorded and the operation time of the recording unit 3 or the power supply time for the heater 4 is set, an operating unit 10 for inputting dial data or setting the operation time of the recording unit 3, and a timer 11 for supplying time data to the main control unit 8.

The operation of this embodiment will be described next.

First, a user of the facsimile apparatus inputs from the operating unit 10 to the main control unit 8 data on a time zone during which the recording unit 3 is operated or during which the power is supplied to the heater 4. Thus, the main control unit 8 sets this time zone in a predetermined area of the memory 9. As this time zone, a time zone, for example, of 7 a.m. to 6 p.m. is set during which a large number of documents are received and immediate printing and outputting of the received document are required.

Figure 2:
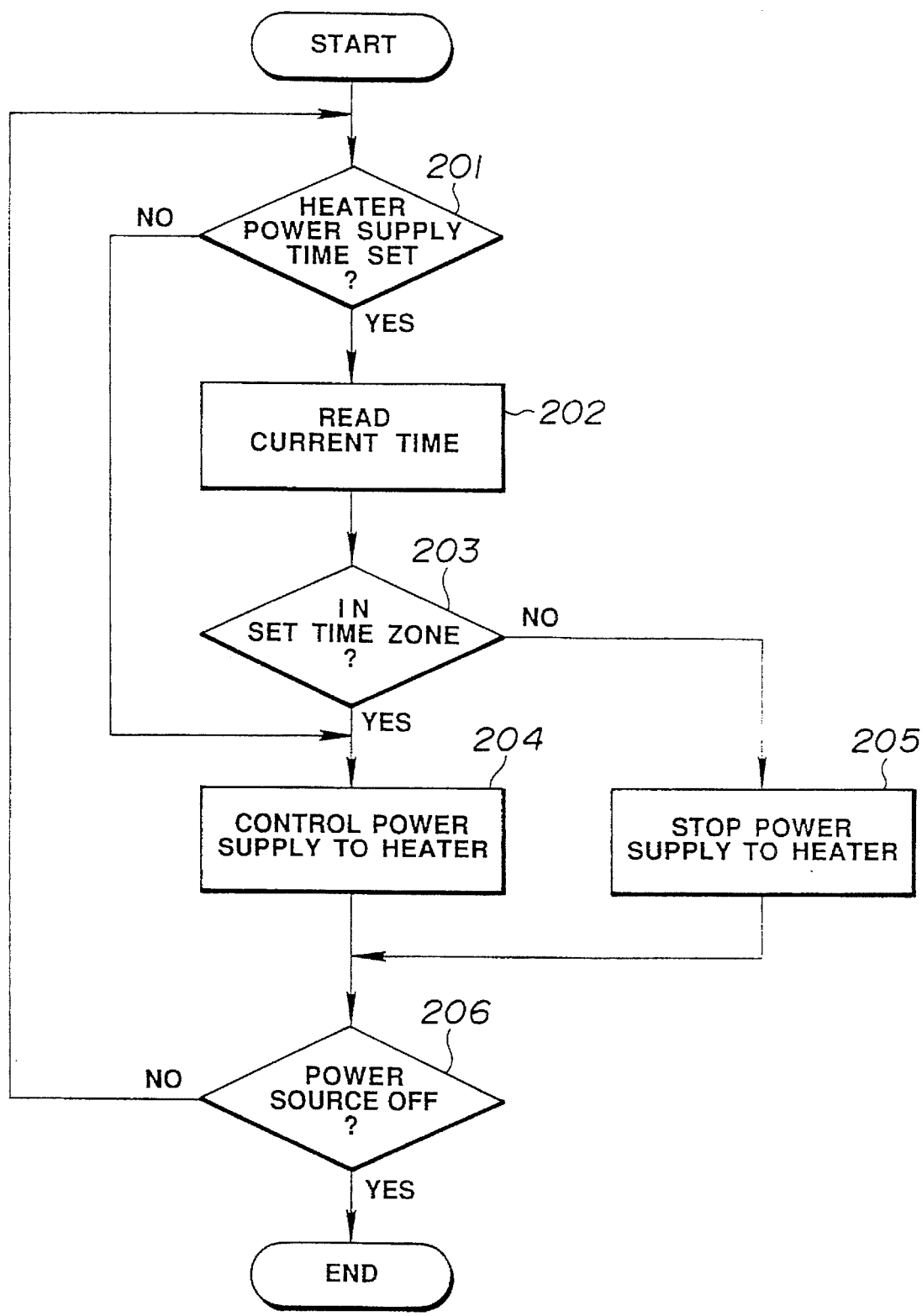
FIG. 2 is a flowchart showing the operation of a recording unit controlled by a main control unit of FIG. 1.

Thus, the main control unit 8 controls the operation of the recording unit 3 as shown in FIG. 2. Namely, at step 201 the main control unit 8 determines whether a power supply time for the heater 4 is set in the memory 9. If not, control passes to step 204 while if it is set, control proceeds to step 202 where the main control unit 8 reads the current time from the timer 11, and determines whether the current time is in the set heater power supply time zone. If not, control passes to step 205 while if it is in the set time zone, control proceeds to step 204.

At step 204, the main control unit 8 controls so that power is fed to the heater 4 through the heater control unit 6 which controls the heater temperature to be maintained at a predetermined level. Then, control proceeds to step 206.

When control passes to step 205, the main control unit 8 completely stops via the heater control unit 6 the power supply to the heater 4 and puts the apparatus in a memory reception mode in which the received data are temporarily stored in the image memory 7. Therefore, when control passes to step 205, the recording unit 3 is put in a non-operative state.

At step 206, the main control unit 8 determines whether the power source of the facsimile apparatus is off. If not, control returns to step 201 while if it is off, this processing is terminated.

While in this embodiment it is arranged to set the operable time zone of the recording unit 3, it may be arranged conversely to set a non-operative time zone of the recording unit 3 to perform a similar operation. As this time zone, a time zone, for example, of 6 p.m. to 7 a.m. is set during which a small number of documents are received and immediate printing and outputting of the received document are not required.

Figure 3:
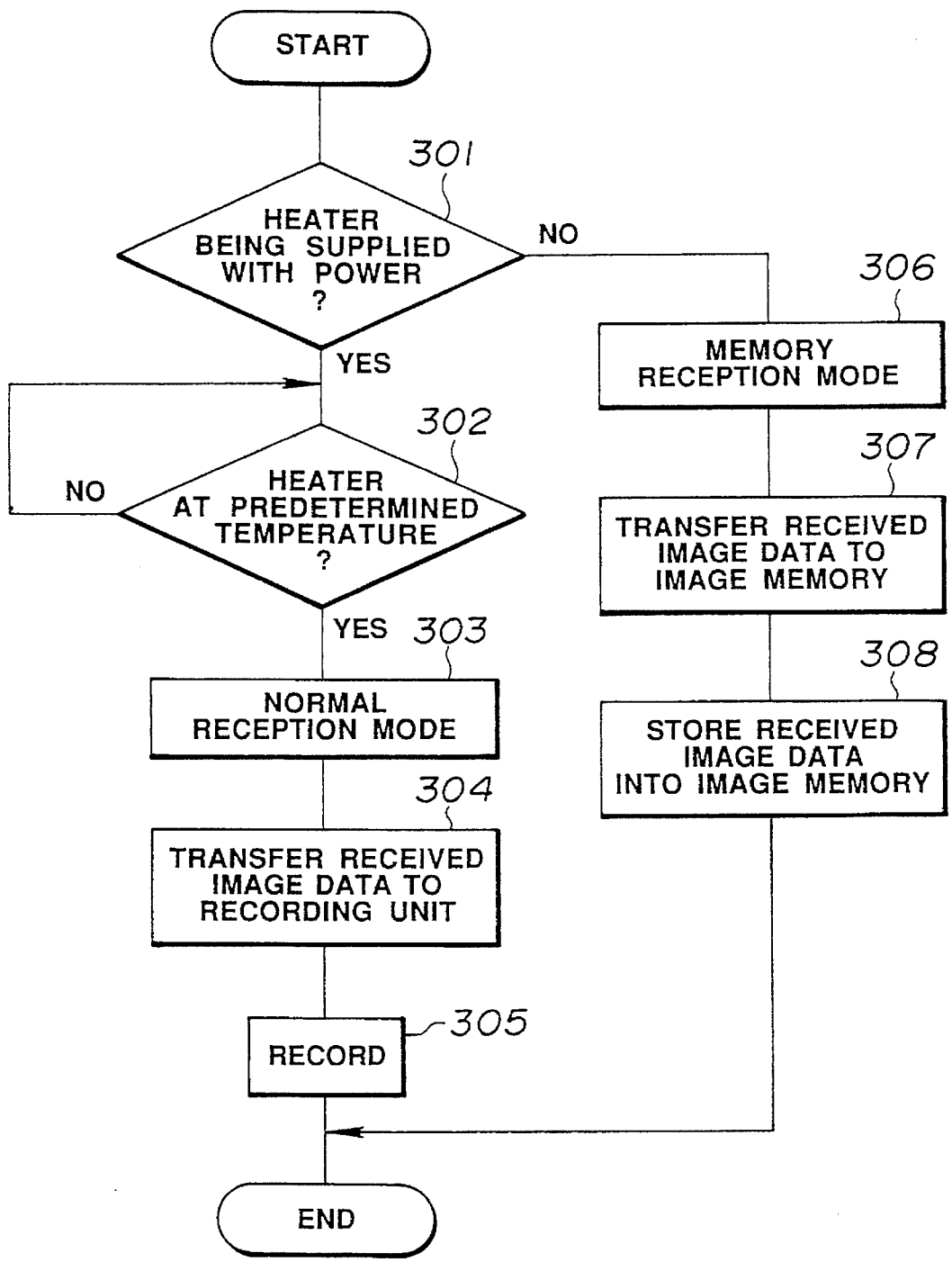
FIG. 3 is a flowchart showing one example of document receiving operation of the facsimile apparatus shown in FIG. 1.

Next, the operation of the facsimile apparatus of this embodiment will be described with respect to the operation performed when the receiver 2 receives image data from the telephone line 1 by referring to the flowchart of FIG. 3.

When the receiver 2 receives image data on the telephone line 1, it demodulates the received image data and delivers it to the main control unit 8. The main control unit 8 first checks whether the heater 4 is being supplied with power by the heater control unit 6 (step 301). If so, it further checks whether the heater 4 is at a predetermined temperature level at which the recording of data by the recording unit 3 is possible (step 302). If the heater 4 is at the predetermined temperature level, a normal reception mode in which the power is supplied to the recording unit 2 is employed. Thus, the main control unit 8 decodes the image data received from the receiver 2, and transfers the resulting data to the recording unit 3 (step 304). The recording unit 3 converts the received image data into print data and prints and outputs the converted data on the recording paper 5 (step 305). At this time, a toner is fixed on the recording paper 5 by the heat of the heater 4.

At step 301, if the main control unit 8 determines that the heater 4 is not being supplied with power, the memory reception mode is employed (step 306), and the main control unit 8 transfers to the image memory 7 the demodulated image data received from the receiver 2 (step 307), and stores the received image data into the image memory 7 (step 308).

Thereafter, when the time for supplying power to the heater 4 has arrived and power supply to the heater 4 is started through the heater control unit 6 and the heater 4 is heated up to the predetermined temperature at which the recording unit 3 becomes ready for printing operation, the image data stored in the image memory 7 is then sequentially read out under the control of the main control unit 8 and transferred to the recording unit 3 for printing and outputting the image data on the recording paper 5.

In the memory reception mode, the main control unit 8 controls writing of communication records into a predetermined area of the memory 9, reads the communication records written in the memory 9 and outputs the data through the recording unit 3 after the recording unit 3 becomes ready for printing operation. Thus, the user can determine whether all the documents received in the memory reception mode when the recording unit 3 is in the non-operative state have been output from the recording unit 3 after the recording unit 3 has been put into the operative state.

If the image memory 7 becomes full in the memory reception mode, image data received thereafter cannot be stored in the image memory 7, and would be abandoned or overwritten on the already stored received image data. To avoid this situation, when the image memory 7 becomes full, power supply to the heater 4 is automatically started even during the non-operative time zone of the recording unit 3 so as to print and output the image data stored in the image memory 7.

Figure 4:
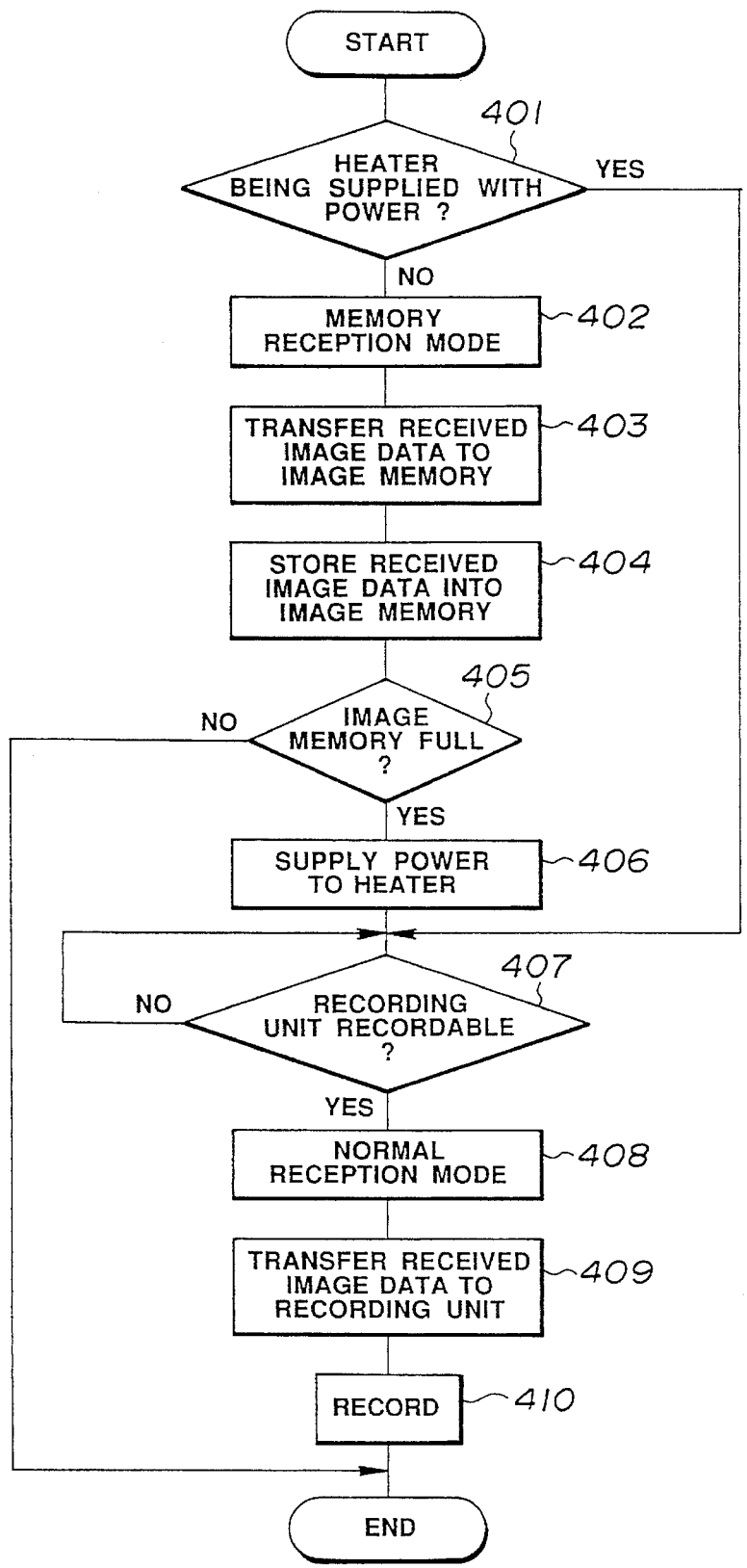
FIG. 4 is a flowchart showing another example of document receiving operation by the facsimile apparatus of FIG. 1.

FIG. 4 illustrates an embodiment of this invention arranged for coding with the situation where the image memory 7 becomes full in the memory reception mode.

When the receiver 2 receives image data on the telephone line 1 and delivers it to the main control unit 8, the main control unit 8 checks whether the heater 4 is being supplied with power (step 401). If not, the memory reception mode is employed (step 402) and the main control unit 8 transfers the received image data to the image memory 7 (step. 403), and stores it in the image memory 7 (step 404). If the image data stored in the image memory 7 exceeds a predetermined quantity, at which the image memory 7 becomes full (step 405), the main control unit 8 controls the heater control unit 6 to start power supply to the heater 4 (step 406). When the temperature of the heater 4 arrives at the predetermined temperature and the recording unit 3 is put in the recording state (step 407), the normal reception mode is employed (step 408). Then, the main control unit 8 transfers to the recording unit 3 the received data, in this case, the received image data stored in the image memory 7, automatically prints and outputs the image data on the recording paper 5 (step 410). If the main control unit 8 determines that the heater 4 is being supplied with power at step 401, the control unit 8 checks whether the temperature of the heater 4 has arrived at the predetermined temperature and whether the recording unit 3 is in the recording state (step 407). If so, the normal reception mode is employed (step 408). and the main control unit 8 intactly transfers the received data, in this case, as-received image data, to the recording unit 3, to print and output the image data on the recording paper 5 (step 410).

Figure 5:
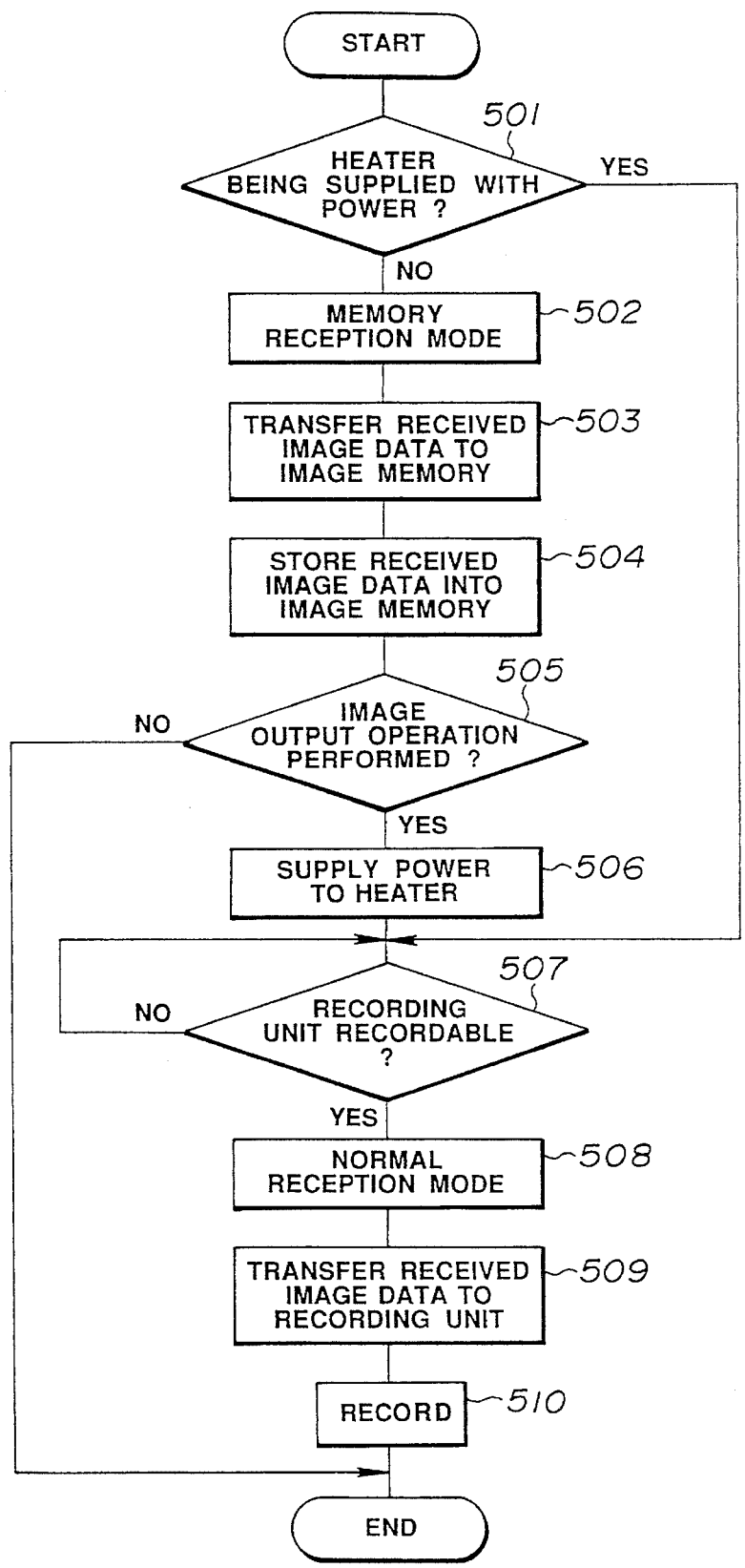
FIG. 5 is a flowchart showing a further example of document receiving operation by the facsimile apparatus of FIG. 1.

FIG. 5 shows the receiving operation of another embodiment arranged for recording and outputting, through the image output operation by the operation unit 10, the image data stored in the image memory 7 during the period when the power supply to the heater 4 has been stopped. In this embodiment, the image data stored in the image memory 7 can be recorded and output during interruption of the power supply to the heater 4 through the image output operation by the operation unit 10.

That is, in FIG. 5, when image data on the telephone line 1 is received by the receiver 2 and delivered to the main control unit 8, the main control unit 8 checks whether the heater 4 is being supplied with power (step 501). If not, the memory reception mode is employed (step 502), The main control unit 8 then transfers the received image data to the image memory 7 (step 503) and stores it into the image memory 7 (step 504). When the image output operation is performed through the operation unit 10 (step 505), the main control unit 8 controls the heater control unit 6 to thereby start power supply to the heater 4 (step 506). When the temperature of the heater 4 arrives at the predetermined temperature and therefore the recording unit 3 becomes recording operative (step 507), the normal reception mode is employed (step 508). The main control unit 8 then transfers to the recording unit 3 the received image data, in this case, the received image data stored in the image memory 7 (step 509), and automatically prints and outputs the image data on the recording paper 5 (step 510). If the main control unit 8 determines that the heater 4 is being supplied with power at step 501, it further determines whether the heater 4 has arrived at the predetermined temperature and the recording unit 3 is in the recording state (step 507). If so, the normal reception mode is employed (step 508) and the main control unit 8 intactly transfers to the recording unit 3 the received image data, in this case, as-received image data, to print and output the image data on the recording paper 5 (step 510).

As described above, according to this embodiment, the time-of-day period for operating the recording unit 3 can be set arbitrarily. For example, the time-of-day period can be set such that the recording unit 3 is not operated or no power is supplied to the heater 4 at night time during which the apparatus is set in the memory reception mode for receiving image data. Thus, the power supplied to the heater 4 can be greatly reduced and hence the running cost of the apparatus can be reduced. Further, in the night time when no attendant is available, since it is not required to immediately print out the received documents, the above-mentioned advantages can be realized without imparting the convenience of the apparatus.

Next, another embodiment of a facsimile apparatus of the present invention will be described with reference to FIG. 6.

Figure 6:
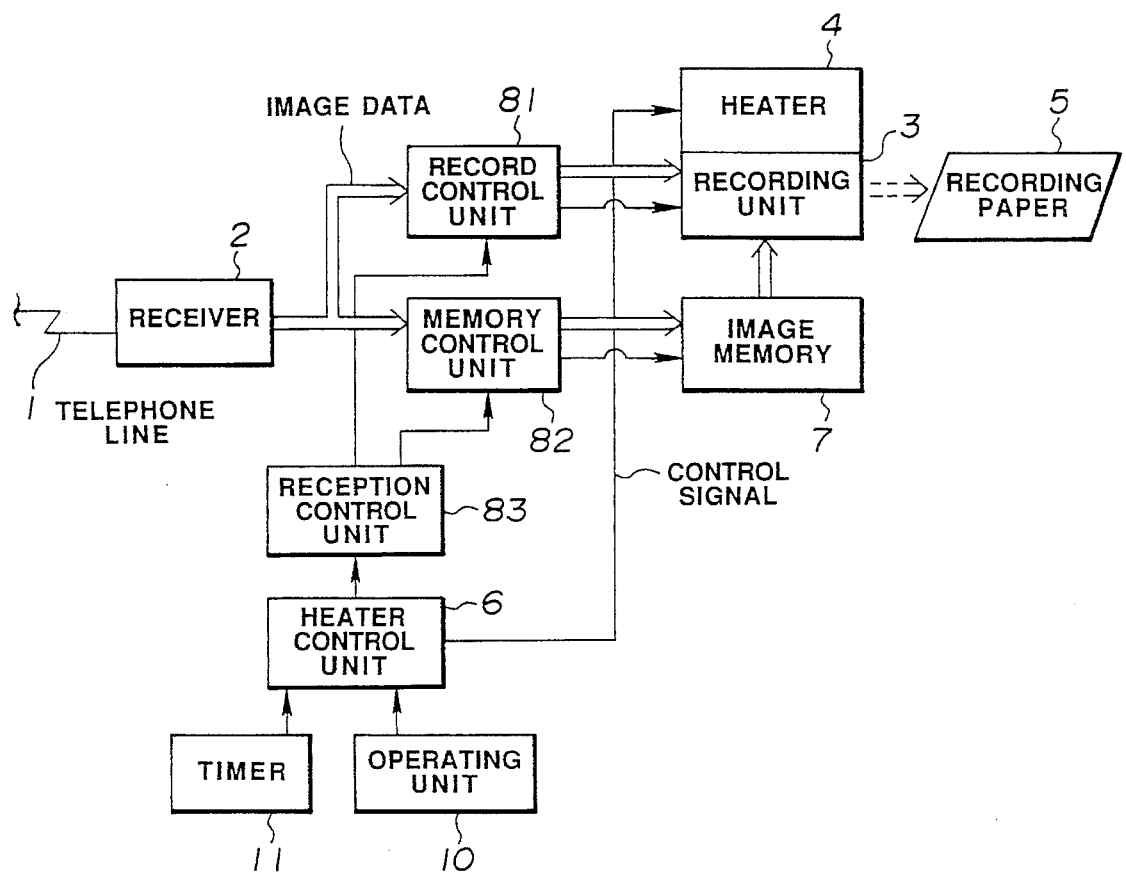
FIG. 6 is a block diagram of another embodiment of a facsimile apparatus according to the present invention.

FIG. 6 is a block diagram indicative of another embodiment of a facsimile apparatus according to the present invention. The facsimile apparatus of this embodiment is connected to a telephone line 1 and comprises a receiver 2 for receiving a facsimile signal from the telephone line 1 and demodulating the facsimile signal, a recording unit 3 for printing and outputting the received image data on a recording paper (regular paper) 5, a heater 4 for fixing a toner on the recording paper 5 when recording the received image data on the recording paper 5, a heater control unit 6 for controlling power supply to the heater 4 to maintain a heater temperature at a predetermined level, an image memory 7 for temporarily storing the received image data, a record control unit 81 for controlling the operation of the recording unit 3 so that the received image data is recorded on the recording paper 5 by the recording unit 3, a memory control unit 82 for controlling the image memory 7 to temporarily store the received image data, and also controlling the operation of the image memory 7 to supply the temporarily stored image data to the recording unit 3, a reception control unit 83, an operating unit 10 for inputting dial data or setting the operation time of the heater 4, and a timer 11 for supplying time data to the heater control unit 6.

The operation of this embodiment will be described next.

First, a user of the facsimile apparatus inputs from the operating unit 10 to the heater control unit 6 data on a time zone during which the recording unit 3 is operated or during which the power is supplied to the heater 4. Thus, the heater control unit 6 controls, on the basis of the data on the time zone input from the operating unit 10 and the time data supplied from the timer 11, so that the heater 4 is supplied with power or the recording unit 3 is operated during this time-of-day period. As this time-of-day period, a time zone, for example, of 7 a.m. to 6 p.m. is set during which a large number of documents are received and immediate printing and outputting of the received document are required.

Further, the heater control unit 6 informs the reception control unit 83 of whether the heater 4 is supplied with power. The reception control unit 83, if informed from the heater control unit 6 that the heater 4 is supplied with power, controls to set the record control unit 81 into the operative state and to set the memory control unit 82 into the nonoperative state, while if informed that the heater 4 is not supplied with power, controls to set the record control unit 81 into the non-operative state and to set the memory control unit 82 into the operative state.

Accordingly, during the time zone in which the heater 4 is not supplied with power or the recording unit 3 is not operated, control is made to store the image data into the image memory 7.

As described above, according to this embodiment, as similar to the embodiment of FIG. 1, a time zone for operating the recording unit 3 can be arbitrarily set. Namely, a time zone can be set such that, for example, during the night time, the recording unit 3 is not operated or power is not supplied to the heater 4 and the image data is received in the memory reception mode. With this arrangement, the power supply to the heater 4 is remarkably reduced and therefore the running cost of the apparatus can be reduced. Furthermore, since it is not required to immediately output the received image data during the night time, the above-mentioned advantageous effects can be realized without imparting the convenience of the apparatus.

The present invention is not limited to facsimile apparatus which include a recording unit with a toner fixing heater to record image data on a regular paper using a laser system or an LED system. The present invention is also applicable similarly to facsimile apparatus having recording units of other types which are constantly supplied with power for immediately recording and outputting image data when the image data is received.

What is claimed is:

1. A facsimile apparatus comprising:

image data reception means for receiving image data;

image data recording means for recording the image data;

image data storing means for storing the image data;

timer means for supplying time data;

operating means for setting a period of time as a portion of the time data;

power supply control means for stopping a supply of power to the image data recording means when the time data supplied by the timer means is in the period of time set by the operating means;

reception control means for storing in the image data storing means the image data received by the image data reception means while the supply of power to the image data recording means is stopped by the power supply control means;

storage quantity detecting means for detecting a quantity of the image data stored in the image data storing means; and image data recording control means, when the quantity of the image data stored in the image data storing means and detected by the storage quantity detecting means exceeds a predetermined value, for supplying power to the image data recording means and, when the image data recording means is put in a recording state, for transferring to the image data recording means the image data stored in the image data storing means to record the image data.

2. A facsimile apparatus according to claim 1, wherein the image data recording means comprises a heater for fixing a toner on a recording paper, and wherein the image data recording control means starts to record and output the image data stored in the image data storing means when a temperature of the heater reaches a predetermined recording temperature value or more.

3. A facsimile apparatus comprising:

image data reception means for receiving image data;

image data recording means for recording the image data;

image data storing means for storing the image data;

timer means for supplying time data;

operating means for setting a period of time as a portion of the time data;

power supply control means for stopping a supply of power to the image data recording means when the time data supplied by the timer means is in the period of time set by the operating means;

reception control means for storing in the image data storing means the image data received by the image data reception means while the supply of power to the image data recording means is stopped by the power supply control means;

recording instruction means for instructing recording of the image data stored in the image data storing means;

power supply means for supplying power to the image data recording means when the recording instruction means instructs the recording of the image data;

detecting means for detecting that the image data recording means is put into a recording state by power supplied from the power supply means; and image data transfer means for transferring the image data stored in the image data storing means to the image data recording means when the detecting means detects that the image data recording means is put into the recording state.

4. A facsimile apparatus according to claim 3, wherein the image data recording means comprises a heater for fixing a toner on a recording paper; and wherein the detecting means detects that a temperature of the heater reaches a predetermined recording temperature value or more.

* * * * *